(12) United States Patent
McDaniel (10) Patent No.: US 8,858,152 B1
(45) Date of Patent: Oct. 14, 2014

(54) SYSTEM FOR REPLACING BATTERIES IN ELECTRIC CARS

(76) Inventor: Steven D. McDaniel, Ozark, AL (US)

( * ) Notice: Subject to any disclaimer, the term of this patent is extended or adjusted under 35 U.S.C. 154(b) by 1197 days.

(21) Appl. No.: 12/775,450

(22) Filed: May 6, 2010

(51) Int. Cl.
B65F 9/00 (2006.01)

(52) U.S. Cl.
USPC ....... 414/809; 414/331.02; 414/390; 414/398

(58) Field of Classification Search
None
See application file for complete search history.

(56) References Cited

U.S. PATENT DOCUMENTS

| | | |
|---|---|---|
| 4,450,400 A | 5/1984 | Gwyn |
| D334,894 S | 4/1993 | Timm |
| 5,612,606 A | 3/1997 | Guimarin et al. |
| 5,631,536 A | 5/1997 | Tseng |
| 5,760,569 A | 6/1998 | Chase, Jr. |
| 5,951,229 A | 9/1999 | Hammerslag |
| 5,998,963 A | 12/1999 | Aarseth |
| D426,518 S | 6/2000 | Hatanaka et al. |
| 7,004,710 B1 | 2/2006 | Quade |
| 8,164,302 B2 * | 4/2012 | Capizzo ........................ 320/109 |

* cited by examiner

Primary Examiner — Saul Rodriguez
Assistant Examiner — Willie Berry, Jr.

(57) ABSTRACT

A system for replacing a discharged battery in a vehicle featuring a trolley with wheels operatively connected to a driving mechanism, the trolley can be directed to a battery tunnel of a vehicle via sensors; a moving battery tray mounted atop the trolley via a hydraulic cylinder, which functions to move the moving battery tray upwardly and downwardly; a charged battery removably disposed atop the moving battery tray; a locking system for locking the charged battery into the battery tunnel of the vehicle. The system allows the trolley to deliver the charged battery from a charging station to the vehicle. The discharged battery is removed from the vehicle in the same process the charged battery is installed in the vehicle. The trolley can carry the discharged battery back to the charging station for recharging.

9 Claims, 9 Drawing Sheets

FIG. 8A
Sequence of Dolly Operation -
Removal of Discharged Battery

FIG. 8B
Sequence of Dolly Operation -
Installment of Charged Battery

SYSTEM FOR REPLACING BATTERIES IN ELECTRIC CARS

FIELD OF THE INVENTION

The present invention is directed to batteries for electric cars, more particularly to a system that replaces batteries in electric cars.

BACKGROUND OF THE INVENTION

Similar to how standard vehicles are limited by their fuel (e.g., gasoline), electric vehicles are limited by their batteries. Electric vehicles may have their batteries either recharged or changed. The present invention features a system for replacing batteries in electric cars. The system brings a charged battery from a charging station to a waiting vehicle, removes the discharged battery in the vehicle, and installs the charged battery into the vehicle.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a system for replacing a discharged battery in an electric vehicle with a charged battery. The system comprises a trolley with wheels, the wheels are each operatively connected to a driving mechanism which functions to move or steer the wheels; a moving battery tray mounted atop the trolley via a hydraulic cylinder, the hydraulic cylinder functions to move the moving battery tray upwardly and downwardly with respect to the trolley, the moving battery tray is divided into a first position and a second position; and a charged battery removably disposed atop the moving battery tray in the first position. The system further comprises a locking system disposed in the battery, the locking system functions to lock the charged battery in a battery tunnel of a vehicle.

The locking system may comprise a cam pivotally attached in the battery, the cam can pivot in a first direction and a second direction; a locking piston pivotally attached to a first end of the cam, the locking piston can move between an extended position wherein the locking piston extends out of the battery and retracted position wherein the locking piston is housed inside the battery; and a tray piston pivotally attached to the cam, the tray piston can slide through a first aperture disposed in the first position of moving battery tray, the tray piston can move between an up position wherein the tray piston is pushed upwardly with respect to the moving battery tray and a down position wherein the tray piston is pushed downwardly with respect to the moving battery tray, wherein the tray piston is biased in the down position.

In some embodiments, a first dowel is disposed on the trolley, the dowel can move between an up position wherein the dowel contacts the tray piston in the first aperture and moves the tray piston to the up position and a down position wherein the dowel does not contact the tray position; wherein when the dowel is in the down position the tray piston is in the down position causing the cam to move in the first direction causing the locking piston to move to the extended position; and wherein when the dowel is moved to the up position the tray piston is moved to the up position causing the cam to move in the second direction causing the locking piston to move to the retracted position.

In some embodiments, the driving mechanism comprises a hydraulic pump, a drive motor, and/or a hydraulic motor. In some embodiments, the hydraulic cylinder is operatively connected to the dowel. In some embodiments, the system further comprises a contactor assembly disposed on the battery, the contactor assembly functions to help prevent contacts of the battery from contacting a tunnel wall of a battery tunnel of a vehicle. In some embodiments, the system further comprises a sensor disposed on the trolley or the moving battery tray, the sensor is configured to detect a battery tunnel sensor disposed in a battery tunnel of a vehicle such that the trolley can be aligned in a certain position under the battery tunnel of the vehicle.

The present invention also features a method of replacing a discharged battery in an electric vehicle with a charged battery. The method may comprise providing the aforementioned system. In some embodiments, a first aperture is disposed in the first position and a second aperture is disposed in the second position. In some embodiments, the system comprises a first dowel disposed on the trolley, the first dowel can move between an up position wherein the first dowel contacts the tray piston in the first aperture and moves the tray piston to the up position and a down position wherein the dowel does not contact the tray position in the first aperture; and a second dowel disposed on the trolley, the dowel can move between an up position wherein the second dowel can contact a tray piston in the second aperture and move the tray piston to the up position and a down position wherein the second dowel does not contact the tray position in the second aperture.

In some embodiments, the method further comprises positioning the trolley under the battery tunnel of the vehicle such that the second position of the moving battery tray is aligned under the discharged battery; raising the moving battery tray via the hydraulic cylinders such that the second position of the moving battery tray contacts the discharged battery, wherein raising the moving battery tray causes the first dowel to move to the up position thereby causing the locking piston of the charged battery to move to the retracted position, and the second dowel to move to the up position thereby causing the locking piston of the discharged battery to move to the retracted position and out of the locking hole in the battery tunnel of the vehicle; moving the trolley forwardly so as to slide the discharged battery out of the battery tunnel and slide the charged battery into the battery tunnel; lowering the battery platform via the hydraulic cylinders, wherein lowering the moving battery tray causes the first dowel to move to the down position thereby causing the locking piston of the charged battery to move to the extended position and into the locking hole in the battery tunnel of the vehicle; and moving the trolley forwardly so as to take away the discharged battery.

DESCRIPTION OF PREFERRED EMBODIMENTS

Referring now to FIGS. 1-8, the present invention features a system 100 for replacing a battery in an electric car, for example at a designated location such as a charging station (or home). Briefly, the system 100 of the present invention comprises a powered trolley with a guiding system that brings a charged battery from a charging station to a waiting vehicle, removes the discharged battery in the vehicle, and installs the charged battery into the vehicle. This is achieved in one pass under the vehicle. The trolley can carry the discharged battery back to the charging area where a mobile hoist removes the battery from the trolley and stores it in a rack system for immediate recharging.

Without wishing to limit the present invention to any theory or mechanism, it is believed that the system 100 of the present invention is advantageous for a variety of reasons. For example, the present invention can help eliminate the need to spend time recharging the battery, it doesn't require that a driver back his/her vehicle into a certain location, it doesn't require that the vehicle have a roller bed system (thus the vehicle may have less weight), and it doesn't require that the vehicle be driven onto guide rails (which can cause abrasion and damage to the tires). Also, the system 100 of the present invention does not require bridging or the construction of tunnels and pits to access the underside of the vehicle. The system 100 of the present invention also has minimal moving parts, which may help reduce maintenance required and may help reduce costs of manufacturing.

Figure 1:
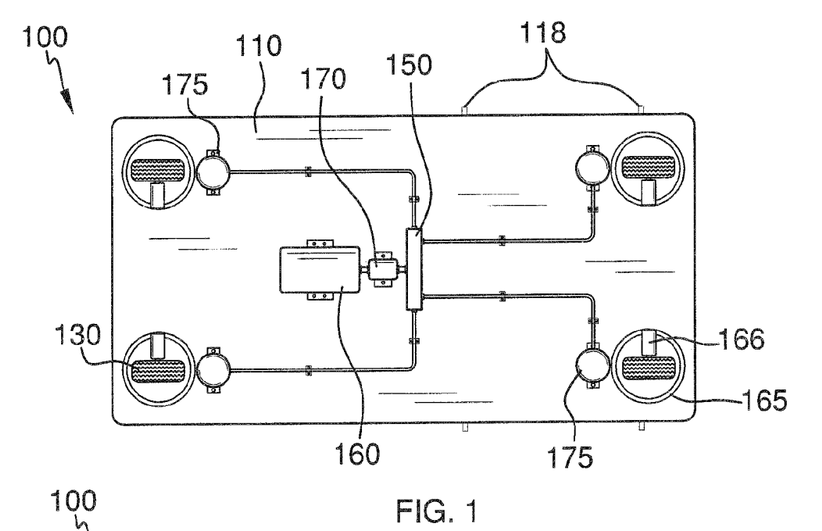
FIG. 1 is a bottom view of the system of the present invention.
Figure 2:
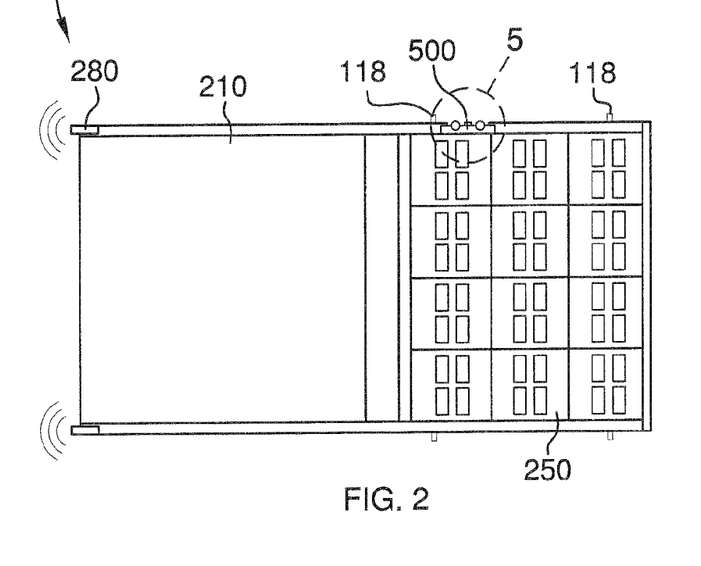
FIG. 2 is a top view of the system of the present invention.
Figure 3:
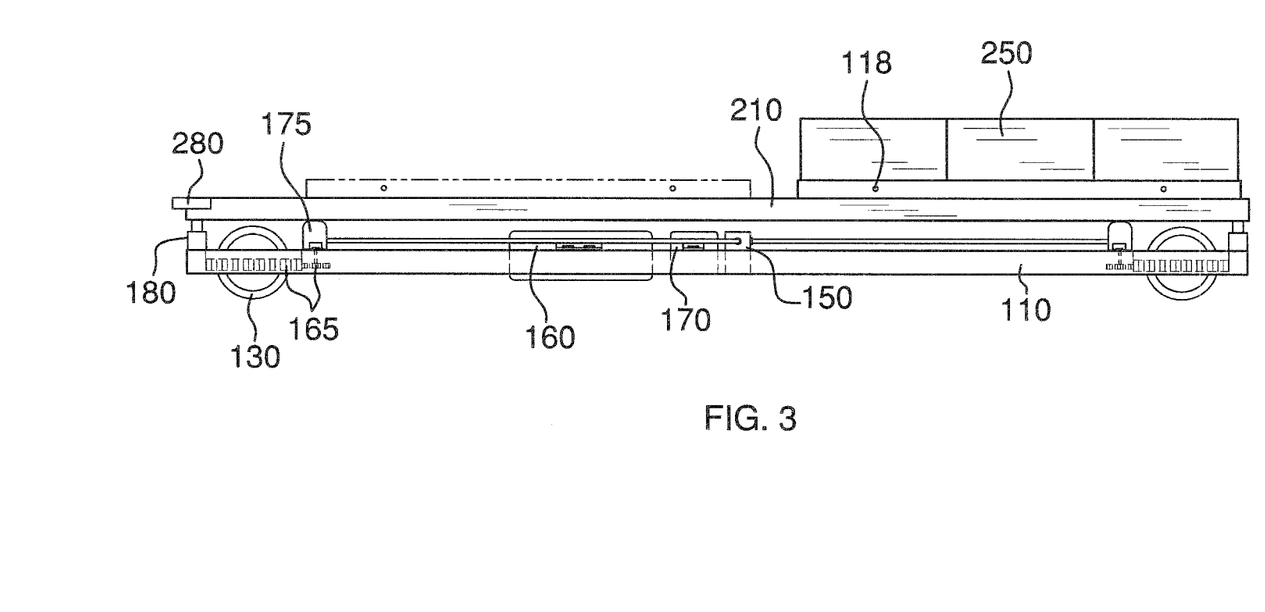
FIG. 3 is a first side view of the system of the present invention.

Referring now to FIG. 1, FIG. 2, and FIG. 3, the system 100 of the present invention comprises a trolley 110. Wheels 130 (e.g., three wheels, four wheels, more than four wheels) are disposed on the bottom surface of the trolley 110, and a battery tray 210 (e.g. a moving battery tray 210) for supporting one or more batteries 250 is disposed on the top surface of the trolley 110. In some embodiments, the batteries 250 are mounted atop stationary battery trays 292, which are supported by the moving battery tray 210. Again, the trolley 110 can bring a charged battery to a vehicle 101, slide underneath the vehicle 101, remove the existing uncharged battery, and then install a charged battery (e.g., into a battery tunnel in the vehicle). The trolley 110 can then carry the uncharged battery away from the vehicle 101.

As shown in FIG. 3, the moving battery tray 210 is mounted atop the trolley 110 but not fixedly attached to the trolley 110. For example, the moving battery tray 210 can be moved upwardly and downwardly with respect to the trolley 110 via one or more hydraulic cylinders 180 disposed in between the moving battery tray 210 and trolley 110. Moving the moving battery tray 210 upwardly and downwardly may be necessary to achieve proper alignment for the battery exchange to occur (and to lock or unlock the battery 250 in place). Also shown in FIG. 3 is the battery 250 mounted atop a stationary battery tray 292, which is mounted atop the moving battery tray 210.

The trolley 110 can be moved and steered as needed. The trolley 110 comprises an electric motor 160 operatively connected to a hydraulic pump 170. The hydraulic pump 170 provides power for all motor functions, for example turning the wheels 130, lifting the moving battery tray 210, rotating the wheels 130, etc. For example, each wheel 130 is operatively connected to a drive motor 166 and to a hydraulic motor 175 (e.g., via gears 165). The hydraulic pump 170 operatively connected to each drive motor 166 and each hydraulic motor 175. As shown in FIG. 1, the hydraulic pump 170 is operatively connected to the hydraulic motors 175 via a manifold 150.

The moving battery tray 210 is for supporting one or more batteries 250 (e.g., batteries 250 on stationary battery trays 292). As shown in FIG. 2, a battery 250 (and stationary battery tray 292) can be positioned (e.g., slidably mounted) in a first position on the moving battery tray 210 (e.g., near the back edge of the trolley 110). In some embodiments, a battery 250 (and stationary battery tray 292) is positioned on a second position on the moving battery tray 210 (e.g., near the front edge of the trolley 110) or two batteries are positioned on the first and second positions on the moving battery tray 210. In some embodiments, the first position is for a charged battery and the second position is for receiving the discharged battery after the battery exchange process occurs. The battery 250 that is used in the system 100 of the present invention is similar to standard batteries used to power electric cars, which are well known to one of ordinary skill in the art. For example, the battery 250 is generally rectangular with standard internal chemicals and standard electrical contacts.

Figure 4:
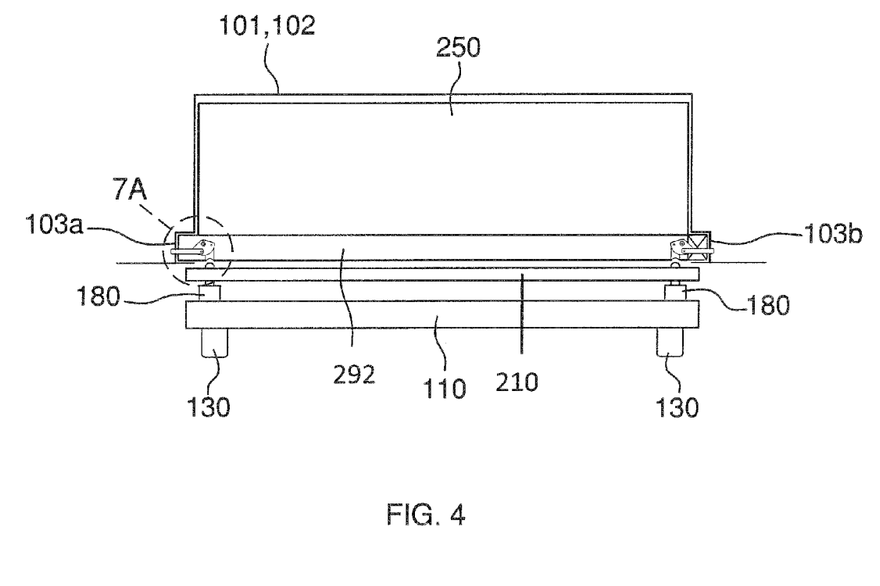
FIG. 4 is a second side view of the system of the present invention as used under a vehicle.
Figure 6:
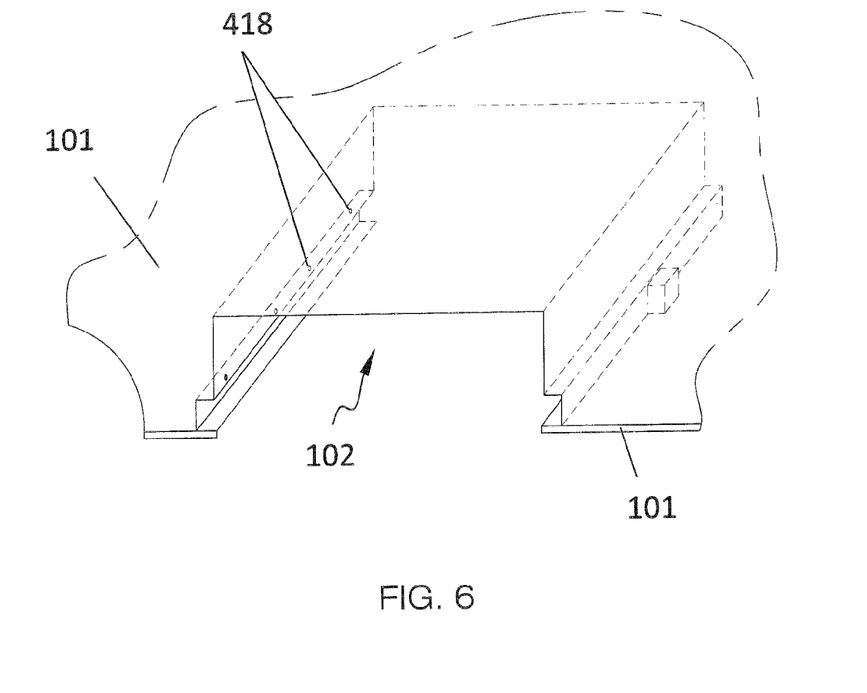
FIG. 6 is a perspective view of a battery tunnel of a vehicle.

FIG. 4 shows the trolley 110 positioned underneath the battery tunnel 102 of the vehicle 101. The battery tunnel 102 shown in FIG. 4 is generally rectangular. On the first side edge of the battery tunnel 102 is a first tunnel track 103*a* and on the second side edge of the battery tunnel 102 is a second tunnel track 103*b*. The tunnel tracks 103 are adapted to accommodate the side edges of the battery 250 and/or stationary battery tray 292 being slid within. The battery 250 is in the battery tunnel 102 where it will be engaged with the vehicle's electrical system (and where the discharged battery is removed). FIG. 6 shows the battery tunnel 120 of the vehicle without the trolley 110 and battery 250 positioned underneath it.

In some embodiments, a trolley sensor 280 is disposed on the trolley 110 (or moving battery tray 210), for example on the front edge of the trolley 110 or the front edge of the moving battery tray 210. In some embodiments, a corresponding battery tunnel sensor is disposed on the vehicle 101, wherein the trolley sensor 280 is configured to detect the battery tunnel sensor to locate the vehicle 101 (e.g., a sensor in the battery tunnel 102 of the vehicle 101). The sensor 280 may function as a guiding system to direct the trolley 110 to an appropriate location and positions. The sensors 280 may help eliminate the need for the vehicle 101 to be in a fixed or specific position. In some embodiments, the vehicle is in a fixed position at the charging station, for example the front or rear wheels of the vehicle rest in depressions in the concrete.

Disposed in the battery 250 (or stationary battery tray 292) is one or more locking systems 200 for locking the battery 250 in place when in the appropriate position in the vehicle's battery tunnel 102. In some embodiments, the locking system 200 comprises a locking piston 118 which can be extended from ("extended position") and retracted into ("retracted position") the battery 250. In some embodiments, the locking system 200 engages a feature (e.g., locking holes 418) of the vehicle's battery tunnel 102. As shown in FIG. 6, the battery tunnel 102 may comprise one or more locking holes 418 adapted to receive the locking piston 118 of the battery 250.

Figure 7A:
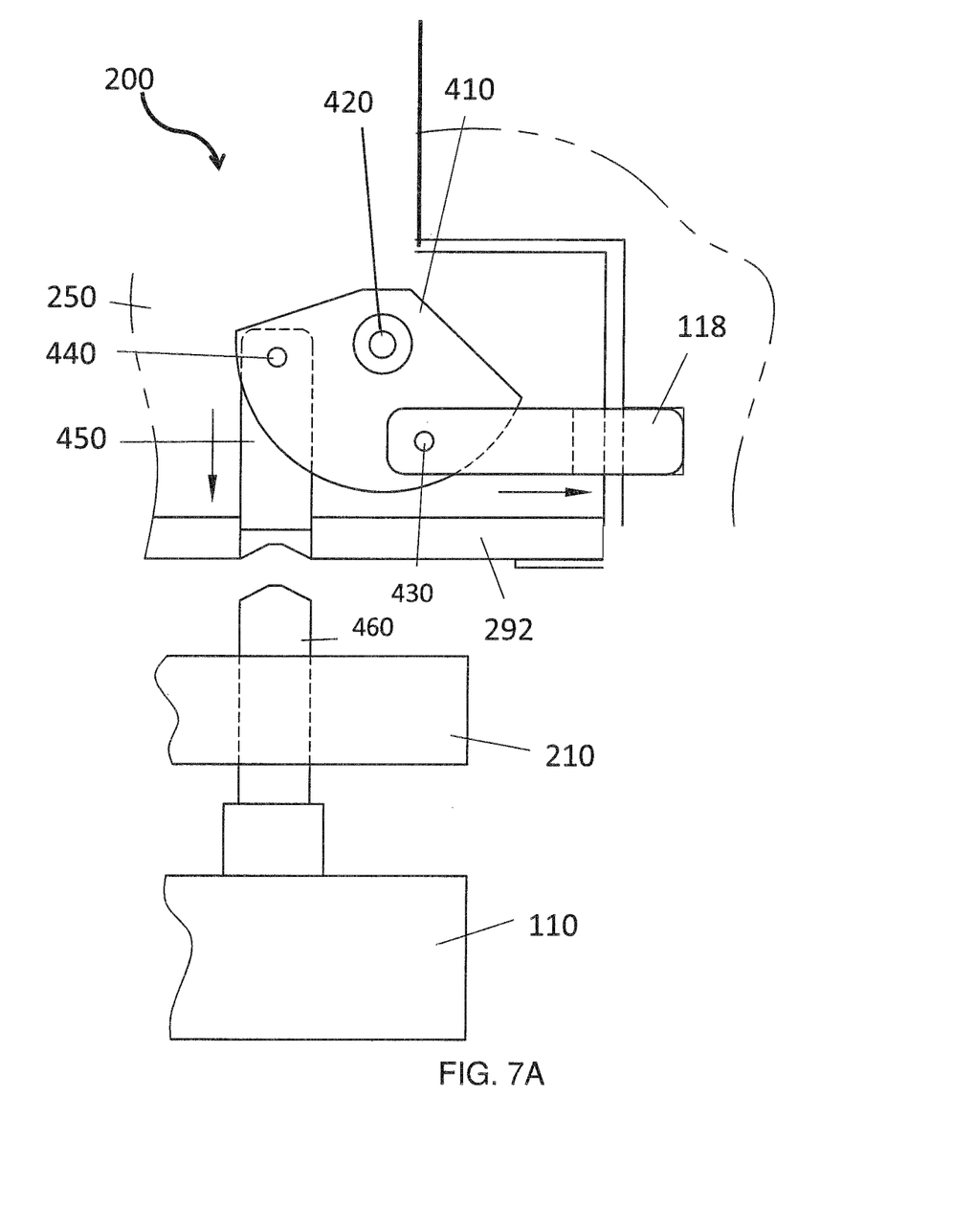
FIG. 7A is a schematic view of the locking system of the system of the present invention, wherein the locking piston is in the extended position.
Figure 7B:
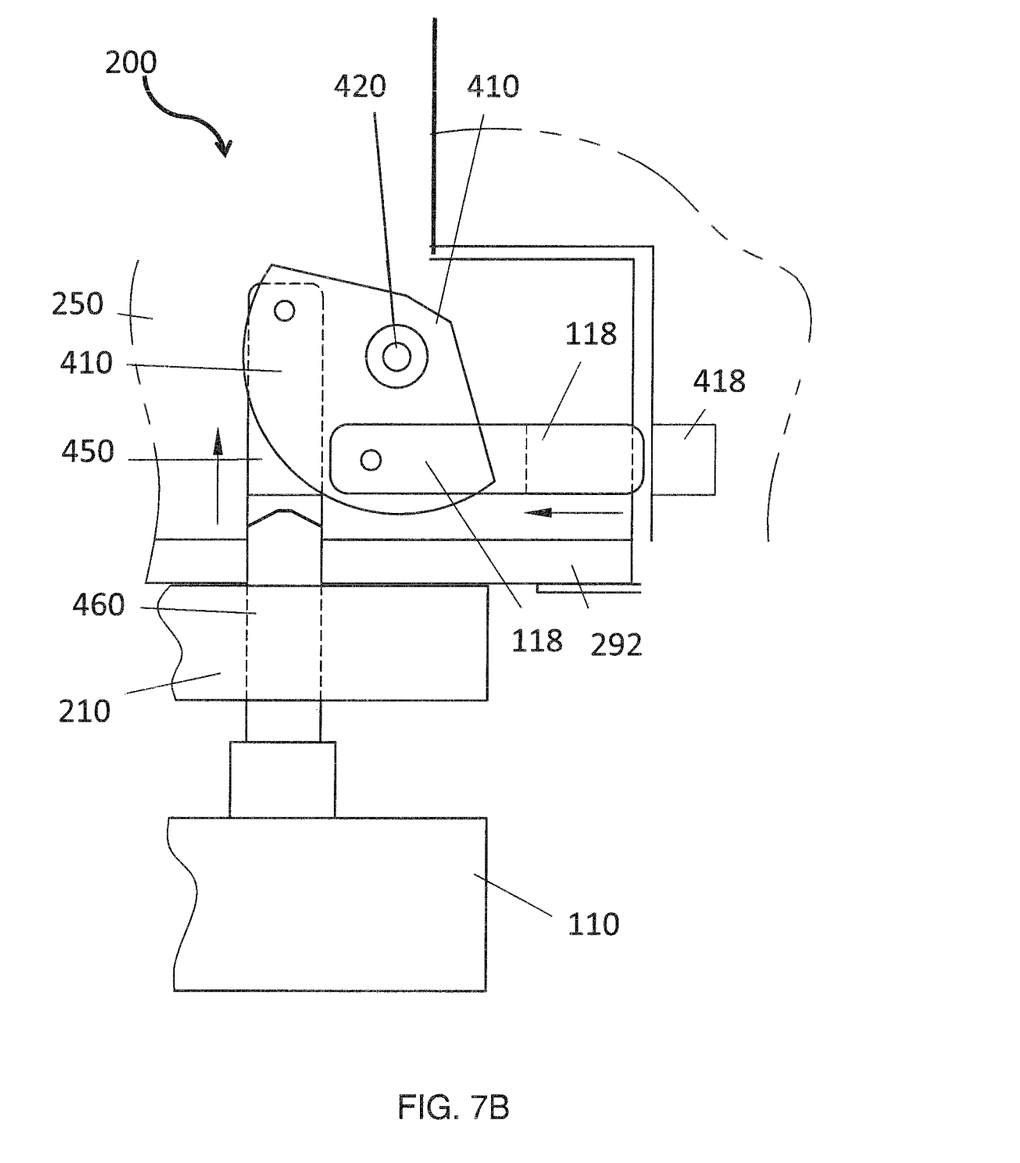
FIG. 7B is a schematic view of the locking system of the system of the present invention, wherein the locking piston is in the retracted position.

Referring now to FIG. 7A and FIG. 7B, in some embodiments, the locking system 200 of the battery/stationary battery tray comprises a cam 410. The first end of the locking piston 118 is attached to the cam 410, and the second end of the locking piston 118 can move in and out of the battery 250 (e.g., retracted position, extended position). In some embodiments, the locking piston 118 is pivotally attached to the cam 410 via a locking piston axle 430.

The cam 410 functions to move the locking piston 118 between the extended and retracted positions. The cam 410 may be pivotally attached in the battery 250 via a main axle 420. The cam 410 can pivot in a first direction and a second direction. For example, when the cam 410 is rotated in the first direction, the locking piston 118 moves to the extended position. When the cam 410 is rotated in the second direction, the locking piston 118 moves to the retracted position.

Other components function to move the cam 410 between the first direction and second direction. For example, in some embodiments, the first end of a tray piston 450 is pivotally attached to the cam 410 (opposite where the locking piston 118 is pivotally attached) via a tray piston axle 440. The tray piston 450 may be slidably disposed in the moving battery tray 210, for example as shown in FIG. 7A the second end of the tray piston 450 extends through the moving battery tray 210 (e.g., toward the trolley 110). When the tray piston 450 is pushed upwardly, the cam 410 moves in the second direction (e.g., the locking piston 118 moves to the retracted position, see FIG. 7B) and when the tray piston is 450 moved downwardly (toward the trolley 110) the cam 410 moves in the first direction (e.g., the locking piston 118 moves to the extended position, see FIG. 7A). In some embodiments, the tray piston 450 is biased downwardly.

In some embodiments, a dowel 460 is disposed on the trolley 110. The dowel 460 is positioned to engage the tray piston 450. In some embodiments, the dowel 460 traverses the moving battery tray 210 and stationary battery tray 292. The dowel 460 can be moved upwardly to an up position and downwardly to a down position (e.g., like the hydraulic cylinders 180 that raise the moving battery tray 210 above the trolley 110). In some embodiments, the hydraulic cylinders 180 are operatively connected to the dowels 460. When the dowel 460 is pushed to the up position (e.g., via the hydraulic cylinders 180), the tray piston 450 is moved upwardly (and the cam 410 moves in the second direction and the locking piston 118 moves to the retracted position, see FIG. 7B). When the dowel 460 is moved to the down position, the tray piston 450 moves downwardly (and the cam 410 moves in the first direction and the locking piston 118 moves to the extended position, see FIG. 7A). The present invention is not limited to the aforementioned locking system.

The present invention also features a method of replacing a discharged battery in an electric vehicle. The method may provide a means of smoothly changing out a battery of an electric vehicle in one slow motion (with two intermittent stops). The method comprises providing the system 100 of the present invention. A driver may be at a charging station. In some embodiments, when the driver turns the power switch off (the vehicle's power switch), the vehicle's main power contactor solenoid 590 disengages (the vehicle 101 comprises a solenoid 590 operatively connected to the electrical system of the vehicle). In some embodiments, this is accomplished by spring loading the solenoid, which maintains the vehicle power contacts in a normally open position. When the power switch is turned on, magnetic contacts in the solenoid 590 activate, pulling the main power contactors for the vehicle into a closed (powered) position. Similar solenoids are found in HVAC and auto industries.

Figure 8A:
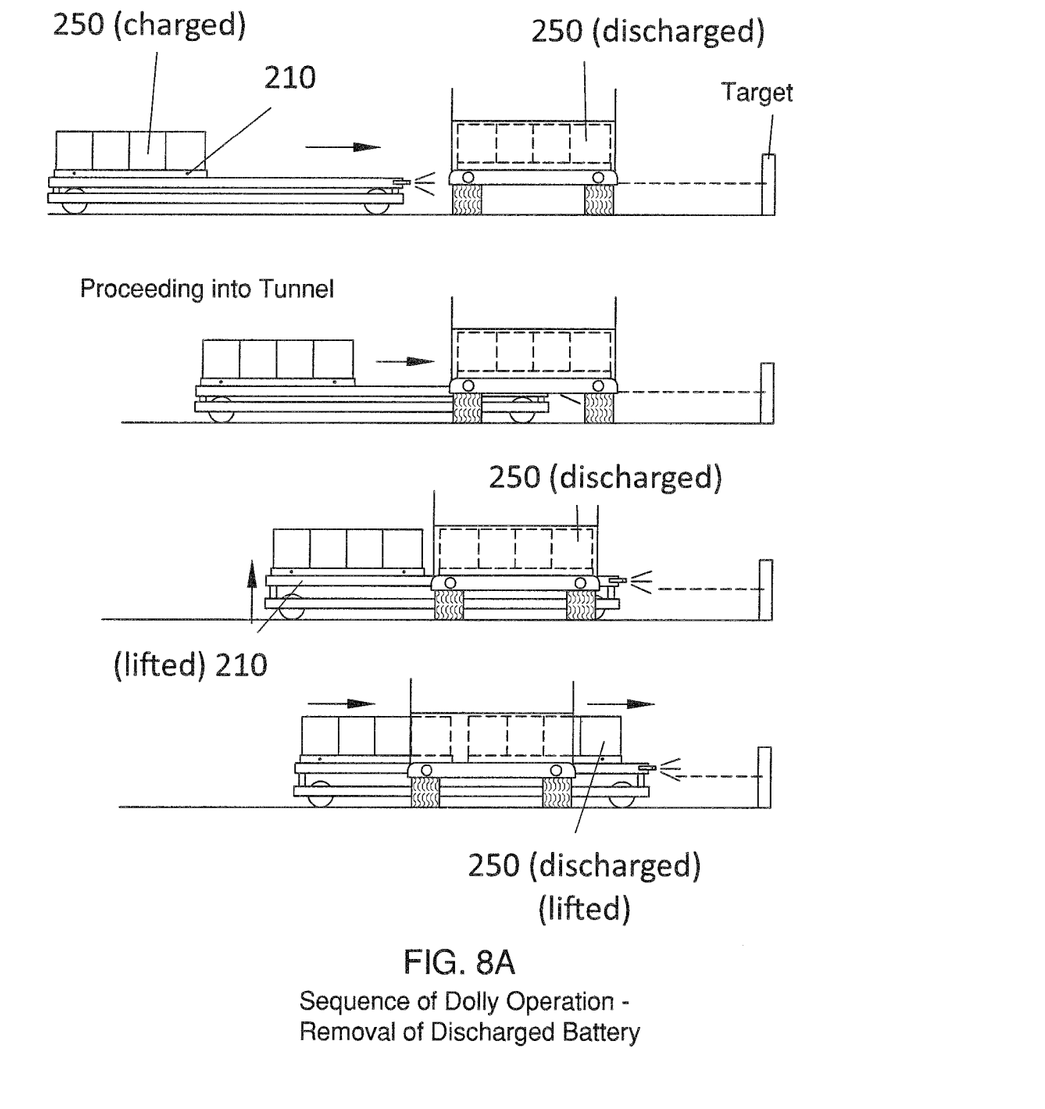
FIG. 8A is a schematic representation of the method of the present invention, wherein the discharged battery is disengaged from the battery tunnel of the vehicle.
Figure 8B:
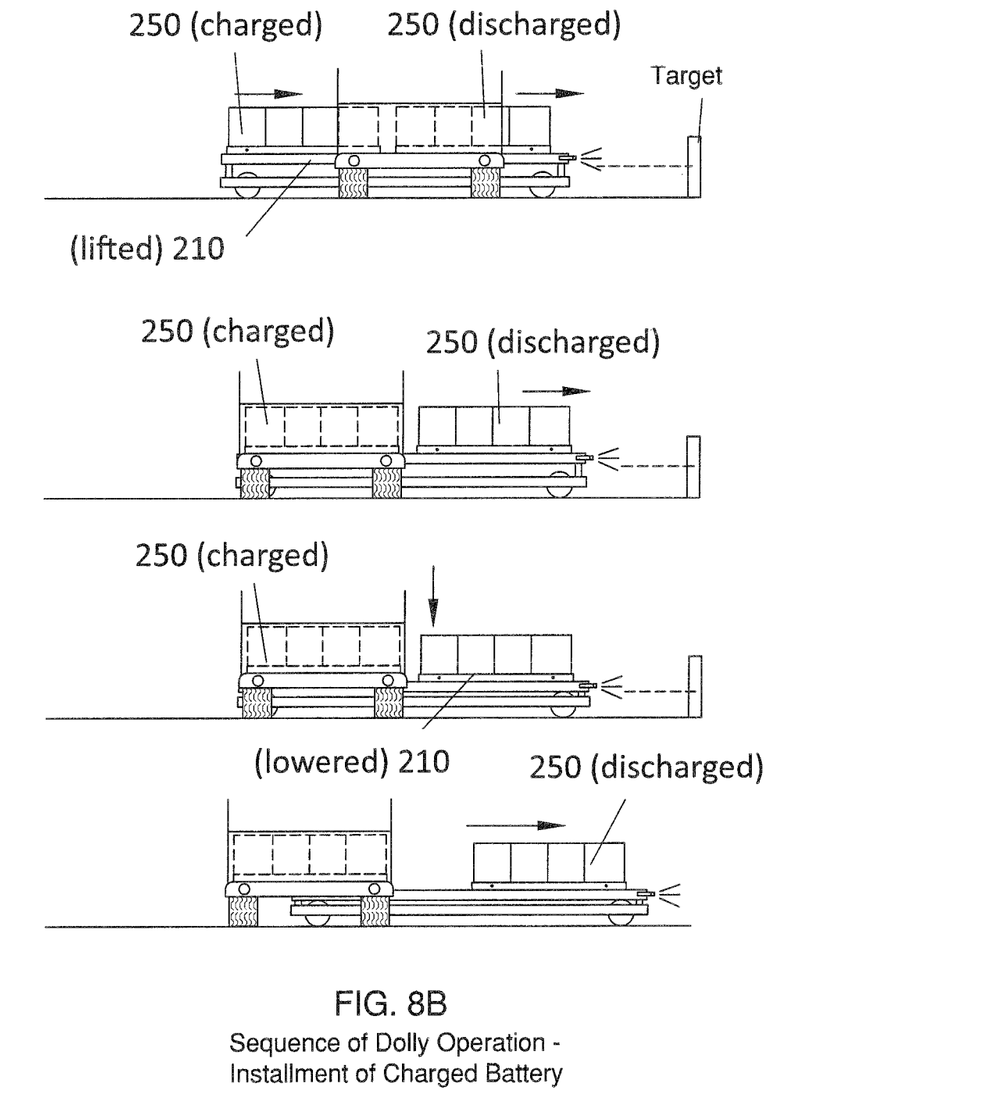
FIG. 8B is a schematic representation of the method of the present invention, wherein the charged battery is engaged in the battery tunnel of the vehicle and the discharged battery is carried away from the vehicle.

Referring now to FIG. 8A and FIG. 8B, the trolley 110 with a charged battery 250 approaches the vehicle 101. In some embodiments, the sensors 280 help direct the trolley 110 to the appropriate position (near or under the battery tunnel 102). In FIG. 8, the sensors 280 are shown interacting with a target that is not a part of the vehicle (e.g., the target is a structure in the charging station). The trolley passes under a portion of the battery tunnel 102 of the vehicle 101. For example, the moving battery tray 210 passes underneath a portion of the battery tunnel 102 such that the second position of the tray 210 is aligned with the discharged battery locked in the battery tunnel 102.

Next, the moving battery tray 210 may be elevated via the hydraulic cylinders 180 (to a height determined by simple maximum height design and/or sensors and/or a microprocessor). The moving battery tray 210 contacts the discharged battery 250 (e.g., the discharged battery 250 being mounted atop its own stationary battery tray 292). The locking system 200 is also disengaged at this time so as to move the locking pistons 118 to the retracted position (thus disengaging them from the locking holes 418 in the vehicle 101). For example, the dowels 460 may be raised so as to contact and raise the tray pistons 450. Lifting of the moving battery tray 210 can lift the discharged battery 250 (and stationary battery tray 292) (unlocked) from the battery tunnel 102 (effectively disconnecting the battery pack).

The trolley 110 may then continue to move forwardly, sliding the discharged battery 250 out of the exit side of the battery tunnel of the vehicle. As this occurs, the charged battery 250 (and its own stationary battery tray 292) is slid into the entrance side of the battery tunnel of the vehicle. The charged battery 250 may be appropriately aligned by proximity and/or digitally controlled sensors (or other means, for example notches, e.g., V-notches, etc.). Next, the battery platform 210 is lowered and the locking system 200 (of the battery/stationary battery tray) is engaged so as to move the locking pistons 118 to the extended position (thus inserting them into the locking holes 418 in the vehicle 101). For example, the dowels 460 may be lowered so as to not contact the tray pistons 450.

As the battery platform 210 is lowered and the locking system 200 is engaged, the charged battery 250 engages the electrical system of the vehicle (e.g., channel supports). The trolley 110 can then continue moving so as to take away the discharged battery to be recharged. The driver can then turn on the power switch to his/her vehicle, causing the solenoid 590 to engage and the final electrical connection between the vehicle and the battery 250 to be made.

As previously stated, the vehicle 101 comprises a solenoid 590 operatively connected to the electrical system of the vehicle 101. To power the vehicle, the vehicle's solenoid 590 must engage contacts on the battery 250 of the system 100 of the present invention. In some embodiments, the system comprises a contactor assembly 500 disposed on the battery 250 (see FIG. 2, FIG. 5). The contactor assembly 500 may function to help prevent the contacts of the battery 250 from contacting the tunnel wall of the battery tunnel 102 of the vehicle 101.

Figure 5:
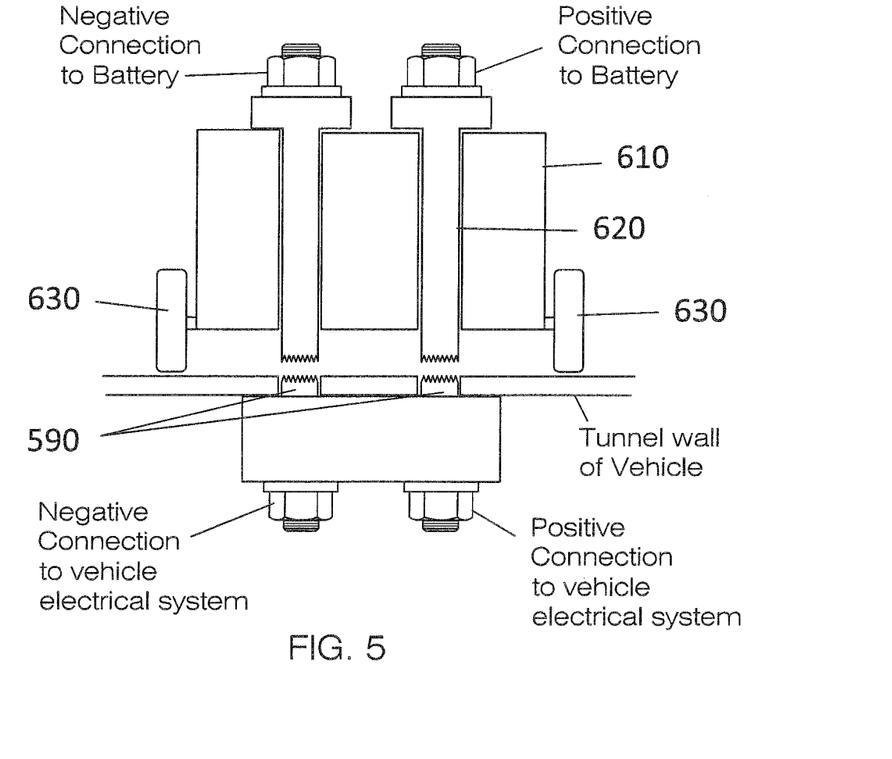
FIG. 5 is a schematic view of the contactor assembly of the present invention.

In some embodiments, the contactor assembly 500 comprises a base 610 through which two conductive terminal extensions 620 span from a first end to a second end. The first ends of the conductive terminal extensions 620 are for engaging the battery terminals. The second ends of the conductive terminal extensions 620 are for engaging the solenoid 590. Disposed on the outer end of the base 610 is one or more spacer wheels 630. The spacer wheels 630 provide space between the second ends of the conductive terminal extensions 620 and the tunnel wall of the vehicle (until the battery 250 is aligned properly and the conductive terminal extensions 620 can engage the solenoid 590). In some embodiments, the spacer wheels 630 are spring-loaded. The contactor assembly 500 is not limited to the aforementioned example and configuration. For example, in some embodiments, the contactor assembly 500 comprises ultra high molecular weight polyethylene (UHMW), the like, or a combination thereof.

In some embodiments, the sensors 280 on the trolley 110 (or moving battery tray 210) are operatively connected to a control panel, which functions to manipulate the movement of the trolley 110 (e.g., via the hydraulic drive system and the steering system) and/or the movement of the moving battery tray 210 upwardly and downwardly (e.g., via the hydraulic cylinders 180). In some embodiments the control panel is a remote control panel.

In some embodiments, the sensors 280 on the trolley 110 (or moving battery tray 210) are photo or laser sensors, which are well known to one of ordinary skill in the art. The sensors 280 may be operatively connected to a microprocessor, wherein the microprocessor is preprogrammed to recognize a target (e.g., an image, the image may be similar to a decal and the like) on the vehicle. In some embodiments, the target is disposed on the battery tunnel 102 (e.g., the interior of the battery tunnel 102) of the vehicle 101. However, in some embodiments, the target is not on the vehicle. In some embodiments, the battery tunnel comprises doors that can open and close respectively allowing and preventing access to the interior of the battery tunnel 102 of the vehicle 101. In some embodiments, the doors are controlled via a switch (e.g., a remote switch). As the trolley 110 nears the appropriate position (e.g., helped by the sensors 280), the battery pack 250 can become aligned in the appropriate position underneath the battery tunnel 102.

In some embodiments, the trolley 110 is directed to the vehicle 101 via a particular path comprising other targets installed in the floor, walls, or on target posts throughout the area.

The following the disclosures of the following U.S. Patents are incorporated in their entirety by reference herein: U.S. Pat. No. 4,450,400; U.S. Pat. No. 7,004,710; U.S. Pat. No. 5,998,963; U.S. Pat. No. 5,951,229; U.S. Pat. No. 5,760,569; U.S. Pat. No. 5,631,536; U.S. Pat. No. 5,612,606.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A system for replacing a discharged battery in an electric vehicle with a charged battery, said system comprising:
   (a) a trolley with wheels, the wheels are each operatively connected to a driving mechanism which functions to move or steer the wheels;
   (b) a moving battery tray mounted atop the trolley via a hydraulic cylinder, the hydraulic cylinder functions to move the moving battery tray upwardly and downwardly with respect to the trolley, the moving battery tray is divided into a first position and a second position;
   (c) a charged battery removably disposed atop the moving battery tray in the first position; and
   (d) a locking system disposed in the battery, the locking system functions to lock the charged battery in a battery tunnel of a vehicle, wherein the locking system comprises:
      (i) a cam pivotally attached in the battery, the cam can pivot in a first direction and a second direction;
      (ii) a locking piston pivotally attached to a first end of the cam, the locking piston can move between an extended position wherein the locking piston extends out of the battery and retracted position wherein the locking piston is housed inside the battery; and
      (iii) a tray piston pivotally attached to the cam, the tray piston can slide through a first aperture disposed in the first position of moving battery tray, the tray piston can move between an up position wherein the tray piston is pushed upwardly with respect to the moving battery tray and a down position wherein the tray piston is pushed downwardly with respect to the moving battery tray, wherein the tray piston is biased in the down position, wherein the locking piston is pivotally attached to the cam via a locking piston axle; and
   (e) a first dowel disposed on the trolley, the dowel can move between an up position wherein the dowel contacts the tray piston in the first aperture and moves the tray piston to the up position and a down position wherein the dowel does not contact the tray piston; wherein when the dowel is in the down position the tray piston is in the down position causing the cam to move in the first direction causing the locking piston to move to the extended position; and wherein when the dowel is moved to the up position the tray piston is moved to the up position causing the cam to move in the second direction causing the locking piston to move to the retracted position, wherein the hydraulic cylinder is operatively connected to the dowel.

2. The system of claim 1, wherein the driving mechanism comprises a hydraulic pump.

3. The system of claim 1, wherein the driving mechanism comprises a drive motor and a hydraulic motor.

4. The system of claim 1, wherein the cam is pivotally attached in the battery via a main axle.

5. The system of claim 1 further comprising a contactor assembly disposed on the battery, the contactor assembly functions to help prevent contacts of the battery from contacting a tunnel wall of a battery tunnel of a vehicle.

6. The system of claim 5, wherein the contactor assembly comprises ultra high molecular weight polyethylene.

7. The system of claim 6, wherein the contactor assembly comprises a base through which two conductive terminal extensions span, wherein first ends of the conductive terminal extensions are for engaging terminals of the battery and second ends of the conductive terminal extensions are for engaging a solenoid of the vehicle; and one or more spacer wheels disposed on an outer end of the base, the spacer wheels temporarily provide space between the second ends of the conductive terminal extensions and a tunnel wall of the vehicle.

8. The system of claim 1 further comprising a sensor disposed on the trolley or the moving battery tray, the sensor is configured to detect a battery tunnel sensor disposed in a battery tunnel of a vehicle such that the trolley can be aligned in a certain position under the battery tunnel of the vehicle.

9. A system for replacing a discharged battery in an electric vehicle with a charged battery, said system consisting of:
   (a) a trolley with wheels, the wheels are each operatively connected to a driving mechanism which functions to move or steer the wheels;
   (b) a moving battery tray mounted atop the trolley via a hydraulic cylinder, the hydraulic cylinder functions to move the moving battery tray upwardly and downwardly with respect to the trolley, the moving battery tray is divided into a first position and a second position;
   (c) a charged battery removably disposed atop the moving battery tray in the first position; and
   (d) a locking system disposed in the battery, the locking system functions to lock the charged battery in a battery tunnel of a vehicle, wherein the locking system consists of:
      (i) a cam pivotally attached in the battery, the cam can pivot in a first direction and a second direction;
      (ii) a locking piston pivotally attached to a first end of the cam, the locking piston can move between an extended position wherein the locking piston extends out of the battery and retracted position wherein the locking piston is housed inside the battery; and
      (iii) a tray piston pivotally attached to the cam, the tray piston can slide through a first aperture disposed in the first position of moving battery tray, the tray piston can move between an up position wherein the tray piston is pushed upwardly with respect to the moving battery tray and a down position wherein the tray piston is pushed downwardly with respect to the moving battery tray, wherein the tray piston is biased in the down position, wherein the locking piston is pivotally attached to the cam via a locking piston axle; and
   (e) a first dowel disposed on the trolley, the dowel can move between an up position wherein the dowel contacts the tray piston in the first aperture and moves the tray piston to the up position and a down position wherein the dowel does not contact the tray piston; wherein when the dowel is in the down position the tray piston is in the down position causing the cam to move in the first direction causing the locking piston to move to the extended position; and wherein when the dowel is moved to the up position the tray piston is moved to the up position causing the cam to move in the second direction causing the locking piston to move to the retracted position, wherein the hydraulic cylinder is operatively connected to the dowel.

* * * * *